(12) United States Patent
Yu et al.

(10) Patent No.: US 8,359,280 B2
(45) Date of Patent: Jan. 22, 2013

(54) DIVERSIFYING RECOMMENDATION RESULTS THROUGH EXPLANATION

(75) Inventors: Cong Yu, New York, NY (US); Sihem Amer-Yahia, New York, NY (US); Laks Lakshmanan, Vancouver (CA)

(73) Assignee: Yahoo! Inc., Sunnyvale, CA (US)

( * ) Notice: Subject to any disclaimer, the term of this patent is extended or adjusted under 35 U.S.C. 154(b) by 791 days.

(21) Appl. No.: 12/403,140

(22) Filed: Mar. 12, 2009

(65) Prior Publication Data

US 2010/0235317 A1 Sep. 16, 2010

(51) Int. Cl.
*G06F 15/18* (2006.01)
(52) U.S. Cl. .......................................... 706/12
(58) Field of Classification Search ...................... 706/12
See application file for complete search history.

(56) References Cited

OTHER PUBLICATIONS

V. Kostov, E. Naito, and J. Ozawa, "Cellular Phone Ringing Tone Recommendation System Based on Collaborative Filtering Method", Computational Intelligence in Robotics and Automation, Proc. 2003 IEEE Int'l Sympos. on, Jul. 16-20, 2003, pp. 378-383.*
Herlocker, J.L, et al., "Explaining Collaborative Filtering Recommendations," Proceedings of Computer Supported Cooperative Work Conference, Dec. 2000.
Radlinski, F. et al., "Improving Personalized Web Search Using Result Diversification," Proceedings of Special Interest Group Conference on Research and Development in Information Retrieval, Aug. 2006.
Carbonell, J. et al., "The Use of MMR, Diversity-Based Reranking for reordering Documents and Producing Summaries," Proceedings of Special Interest Group Conference on Research and Development in Information Retrieval, Aug. 1998.
Vee, E. et al., "Efficient Computation of Diverse Query Results," Proceedings of 24th International Conference on Data Engineering (ICDE), Mar. 2008.
Ziegler, C-N. et al., "Improving Recommendation Lists Through Topic Diversification," Proceedings of the International World Wide Web Conference Committee, May 2005.

* cited by examiner

*Primary Examiner* — Kakali Chaki
*Assistant Examiner* — Vincent Gonzales
(74) *Attorney, Agent, or Firm* — Hickman Palermo Truong Becker Bingham Wong LLP (57) ABSTRACT

Methods and apparatus for making recommendations of content items to users of computer systems include compiling a database relating a list of items and corresponding explanations; receiving from a user, through a computer user interface, a request for a recommendation; extracting from the database a preliminary list of items related to the request; identifying distances between the extracted items based on the explanation corresponding to each item; and identifying a subset of the preliminary list to form a recommendation list having a limited number of recommendation results with a desired balance of both high relevancy and high diversity relative to each other.

22 Claims, 7 Drawing Sheets

*Item-based Similarity Computation*

Require: *B[K]*;*{B[K]* is an array of item lists - each *B[i]*, i < *K* contains a list of items associated with i users and *B[K]* contains a list of items associated with *K* or more users.}

1: for each item *i* in the system do
    2: *x* = the number of users associated with i;
    3: *B[x].add(i)*;
4: end for
5: for *x* from *K* to *2* do
    6: for each item i in *B[x]* do
        7: *U* = the set of users associated with i;
        8: for each user *u* in *U* do
            9: *S* = 0; *{S* maintains the set of candidate users to be compared with *u*, it also tracks occurrences of each candidate user}
            10: for each item i' associated with *u* do
                11: *S = S* the set of users associated with i';
                12: remove *u* from the list of users associated with i';
                13: *y* = number of users associated with i';
                14: *B[y].remove(i'); B[y - 1].add(i')*;
            15: end for
            16: order users in *S* according to their occurrences;
            17: for each user *u'* in *S* do
                18: *sim* = compare(u, *u'*); *{S* is ordered according to # shared items, we can prune this list of users easily when this number is no longer large enough.}
                19: output: *(u, u', sim)*;
            20: end for
        21: end for
    22: end for
23: end for

FIG. 3

MaxRel

Require: $u, K$;

1: SortedRecItems = Sort RecItems($u$) on score;

2: RetList = topKitems(SortedRecItems,K);

3: return RetList

FIG. 4

MaxDiv

Require: $u, K$;

1: RecItems = RecItems(u);

2: $d = 0.0$; {$d$ is the current maximum diversity}

3: RetList = 0;

4: for each item set $S$ of size $K$ in RecItems do

5: if Diversity(S) > d then

6: $d$ = Diversity(S);

7: Ret List =$S$;

8: end if

9: end for

10: return RetLis

FIG. 5

Swap

Require: $u, K, UB$; {UB is an optional score upper-bound used as a stoping condition;}

1: SortedRecItems = Sort RecItems($u$) on score;
2: RetList = topKItems(SortedRecItems, $K$);
3: $pos = K+1$;
4: for each item $i$ in RetList do
5:    $M$.add($i$); {$M$ is a Heap maintaining each item $i$ in RetList in increasing order of their $D^i_{RetList}$.}
6: end for
7: $i = M$.remove();
8: while $i.score - $SortedRecItems$[pos].score \leq $ UB do
9:    if $D^i_{RetList} < D^{SortedRecItems[pos]}_{RetList}$ then
10:      RetList.remove($i$);
11:      RetList.add(SortedRecItems[pos]);
12:      for each item $j$ in $M$ do
13:        update $D^j_{RetList}$;
14:      end for
15:      $M$.add($i$);
16:      $i = M$.remove();
       {$i$ is a new candidate for swapping}
17:    end if
18:    $pos + +$;
19:    if there is no more item left in SortedRecItems then
20:      break;
21:    end if
22: end while
23: return RetList

FIG 6

Greedy

Require: $u, K$;
1: SortedRecItems = Sort RecItems($u$) on score;
2: UB = 1, LB = 0;
3: DivList = SortedRecItems[0];
4: SimList = ∅;
5: for $i = 1$; SortedRecItems[$i$] ≠ NULL; $i$++ do
6:    if $D_{DivList}^{SortedRecItems[i]} \geq$ UB then
7:       DivList.add(SortedRecItems[$i$]);
8:    end if
9:    if $D_{DivList}^{SortedRecItems[i]} \leq$ LB then
10:      SimList.add(SortedRecItems[$i$]);
11:    end if
12: end for
13: if |DivList| ≥ K then
14:    return $K$ highest scoring items in DivList;
15: end if
16: RemainList = SortedRecItems − SimList
17: if |RemainList| < K then
18:    return RemainList ∪ {$K$ − |RemainList| highest scoring items in SimList};
19: end if
20: while |UB − LB| > 0.01 do
21:    Bound = (UB+LB)/2;
22:    KeepList = ∅
23:    DiscardList = ∅

CONTINUED FROM 7A

```
24:     for i = 1; SortedRecItems[i] ≠ NULL; i + + do
25:        item = SortedRecItems[i];
26:        if DivList.has(item) ∨ SimList.has(item) then
27:           continue; {This item is either in already or should be discard
                       always.}
28:        end if
29:        if D^{item}_{DivList ∪ KeepList} ≤ Bound then
30:           KeepList.add(item);
              {To improve performance, we can break out the for loop here
              if |KeepList ∪ DivList| > K and there are many remain-
              ing items.}
31:        else
32:           DiscardList.remove(item);
33:        end if
34:     end for
35:     if |KeepList ∪ DivList| < K then
36:        DivList = DivList ∪ KeepList;
37:        UB = Bound;
38:     else if |KeepList ∪ DivList| > K then
39:        SimList = SimList ∪ DiscardList;
40:        LB = Bound;
41:     else
42:        DivList = DivList ∪ KeepList;
43:        break;
44:     end if
45: end while
46: if |DivList| ≠ K then
47:     add K − |DivList| highest scoring discarded items to DivList;
48: end if
49: return DivList;
```

FIG 7B

DIVERSIFYING RECOMMENDATION RESULTS THROUGH EXPLANATION

BACKGROUND OF INVENTION

1. Field of Invention

Aspects of embodiments relate to information processing. Some aspects of embodiments relate to computer-generated recommendations made on social networking web sites. Some aspects of embodiments include diversifying recommendation results obtained on such sites through the use of explanations.

2. Discussion of Related Art

Recommendations in social content sites such as del.icio.us, Yahoo! Movies, music sites, news sites, real estate sites, travel sites and others are becoming increasingly important, due to the ineffectiveness of searching based on content alone on those sites. Social content sites often employ tags to classify user content. Tags are text strings having some significance to those assigning and/or referring to them. Tags may be assigned both by content providers and content viewers. As a result, user content is somewhat inconsistently or imperfectly classified, giving rise to difficulties in searching for content by tag. Recommender systems identify content relevant to a user based on criteria related to tags and/or other information associating a user to content.

SUMMARY OF INVENTION

Aspects of embodiments include recommender systems that recommend content based on tag queries made by a user. Recommender systems may over-specialize (or produce result homogeneity), which leads to returning items that are too similar to each other. Homogeneity wastes precious recommendation slots in the final result page, reduces the user's choices to explore alternative relevant results, and even decreases the chances for targeted advertising blurbs that are based on the recommended results. Thus, aspects of embodiments provide a novel diversification mechanism to address the homogeneity problem of conventional systems.

Embodiments of aspects do not require the presence of item attributes, although, as in conventional recommender systems, they may be present. Intrinsic attribute values, if assigned, such as genre and actor for a movie, can help identify similar items. Intrinsic attribute values may not be present, for example where the user-provided content is merely a pointer to the actual content of interest (e.g., URLs in del.icio.us), where the content may be of a varied nature. Explanation-based diversity provides a viable and effective mechanism for accomplishing diversification. Explanation-based diversification has a very wide range of application (e.g., an explanation-based approach applies to cases where items do not have attributes), and consequently may find application in web and computer-based applications at least as diverse as del.icio.us, Yahoo! Movies, music sites, news sites, real estate sites, travel sites, internal document sharing systems, intranet-based content sharing systems and others.

Methods and apparatus for making recommendations of content items to users of computer systems include compiling a database relating a list of items and corresponding explanations; receiving from a user, through a computer user interface, a request for a recommendation; extracting from the database a preliminary list of items related to the request; identifying distances between the extracted items based on the explanation corresponding to each item; and identifying a subset of the preliminary list to form a recommendation list having a limited number of recommendation results with a desired balance of both high relevancy and high diversity relative to each other. In variations, the explanations may comprise: identification by the user of similar items or identification by other users of similar items. In other variations, identifying distances may comprise: identifying a cosine similarity between explanations of items or identifying a Jaccard distance between explanations of items. In yet other variations, identifying a subset of the preliminary list may comprise one or a combination of processes including SWAP and GREEDY.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Computer System

Various aspects and functions described herein in accord with the present invention may be implemented as hardware or software on one or more computer systems. There are many examples of computer systems currently in use. Some examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

Figure 1:
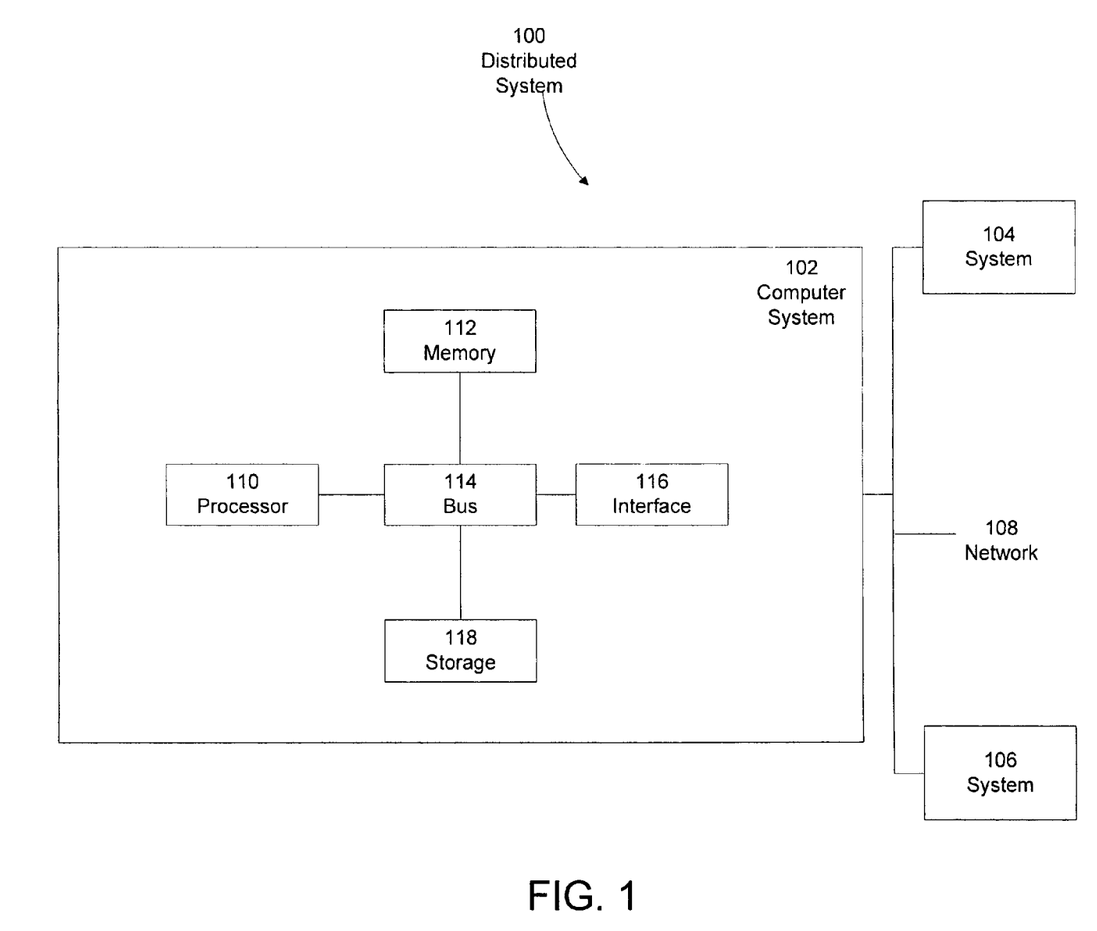
FIG. 1 illustrates an example computer system upon which various aspects in accord with the present invention may be implemented.

FIG. 1 shows a block diagram of a distributed computer system 100, in which various aspects and functions in accord with the present invention may be practiced. The distributed computer system 100 may include one more computer systems. For example, as illustrated, the distributed computer system 100 includes three computer systems 102, 104 and 106. As shown, the computer systems 102, 104 and 106 are interconnected by, and may exchange data through, a communication network 108. The network 108 may include any communication network through which computer systems may exchange data. To exchange data via the network 108, the computer systems 102, 104 and 106 and the network 108 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services. To ensure data transfer is secure, the computer systems 102, 104 and 106 may transmit data via the network 108 using a variety of security measures including TSL, SSL or VPN, among other security techniques. While the distributed computer system 100 illustrates three networked computer systems, the distributed computer system 100 may include any number of computer systems, networked using any medium and communication protocol.

Various aspects and functions in accord with the present invention may be implemented as specialized hardware or software executing in one or more computer systems including a computer system 102 shown in FIG. 1. As depicted, the computer system 102 includes a processor 110, a memory 112, a bus 114, an interface 116 and a storage system 118. The processor 110, which may include one or more microprocessors or other types of controllers, can perform a series of instructions that result in manipulated data. The processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. As shown, the processor 110 is connected to other system elements, including a memory 112, by the bus 114.

The memory 112 may be used for storing programs and data during operation of the computer system 102. Thus, the memory 112 may be a relatively high performance, volatile, random access memory such as a dynamic random access memory (DRAM) or static memory (SRAM). However, the memory 112 may include any device for storing data, such as a disk drive or other non-volatile storage device. Various embodiments in accord with the present invention can organize the memory 112 into particularized and, in some cases, unique structures to perform the aspects and functions disclosed herein.

Components of the computer system 102 may be coupled by an interconnection element such as the bus 114. The bus 114 may include one or more physical busses (for example, busses between components that are integrated within a same machine), but may include any communication coupling between system elements including specialized or standard computing bus technologies such as IDE, SCSI, PCI and InfiniBand. Thus, the bus 114 enables communications (for example, data and instructions) to be exchanged between system components of the computer system 102.

The computer system 102 also includes one or more interface devices 116 such as input devices, output devices and combination input/output devices. The interface devices 116 may receive input or provide output. More particularly, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 116 allow the computer system 102 to exchange information and communicate with external entities, such as users and other systems.

The storage system 118 may include a computer readable and writeable nonvolatile storage medium in which instructions are stored that define a program to be executed by the processor. The storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor 110 or some other controller may cause data to be read from the nonvolatile recording medium into another memory, such as the memory 112, that allows for faster access to the information by the processor than does the storage medium included in the storage system 118. The memory may be located in the storage system 118 or in the memory 112. The processor 110 may manipulate the data within the memory 112, and then copy the data to the medium associated with the storage system 118 after processing is completed. A variety of components may manage data movement between the medium and integrated circuit memory element and the invention is not limited thereto. Further, the invention is not limited to a particular memory system or storage system.

Although the computer system 102 is shown by way of example as one type of computer system upon which various aspects and functions in accord with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, the computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

The computer system 102 may include an operating system that manages at least a portion of the hardware elements included in computer system 102. A processor or controller, such as processor 110, may execute an operating system which may be, among others, a Windows-based operating system (for example, Windows NT, Windows 2000 (Windows ME), Windows XP, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various aspects and functions in accord with the present invention may be implemented in a non-programmed environment (for example, documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

A computer system included within an embodiment may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from Sun Microsystems of Santa Clara, Calif. or integration software such as WebSphere middleware from IBM of Armonk, N.Y. However, a computer system running, for example, SQL Server may be able to support both aspects in accord with the present invention and databases for sundry applications not within the scope of the invention.

Example System Architecture

Figure 2:
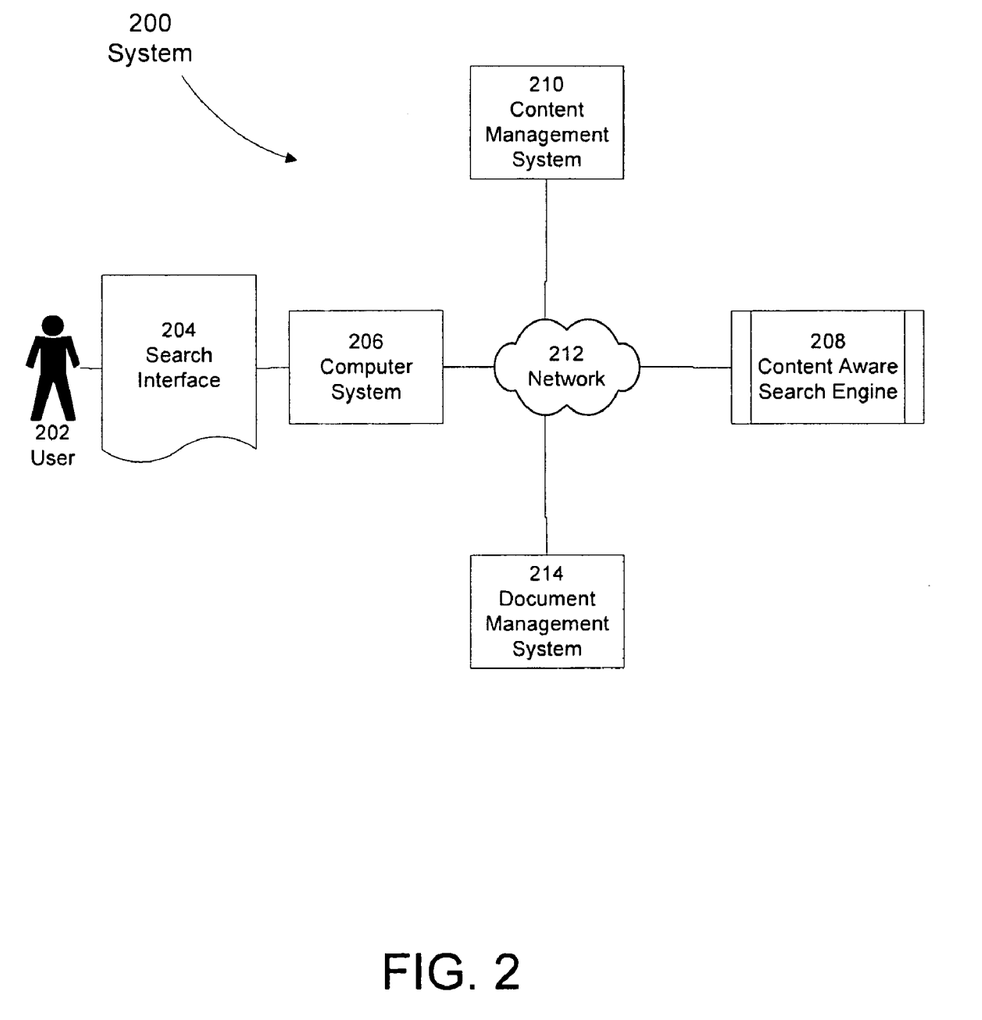
FIG. 2 depicts an example search engine in the context of a distributed system according to an embodiment.

FIG. 2 presents a context diagram of a distributed system 200 specially configured to include an embodiment in accordance with various aspects of the present invention. Referring to FIG. 2, the system 200 includes a user 202, an access interface, such as a search interface 204, a computer system 206, a content delivery engine, such as a search engine 208, a content management system, such as a social networking system 210, and a communications network 212. In the embodiment shown, the access interface 204 is a browser-based user interface served by the content delivery engine 208 and rendered by the computer system 206. In this illustration, the computer system 206, the content delivery engine 208, and the content management system 210 are interconnected via the network 212. The network 212 may include any communication network through which member computer systems may exchange data. For example, the network 212 may be a public network, such as the Internet, and may include other public or private networks such as LANs, WANs, extranets and intranets.

The sundry computer systems shown in FIG. 2, which include the computer system 206, the content delivery engine 208, the content management system 210, and the network 212 each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, the invention is not limited to a specific number of users or systems.

In various embodiments, the content delivery engine 208 includes facilities configured to provide requested content to users. In the illustrated embodiment, the content delivery engine 208 can provide the access interface 204 to the user 202. The access interface 204 may include facilities configured to allow the user 202 to search, select and review a variety of content, including content created by other users and made available through a social networking site. For example, in one embodiment, the access interface 204 can provide, within a set of search results, navigable links to documents or other content available from one or more of a wide variety of websites connected to the network 212. In other embodiments, the access interface 204 can provide links to documents stored in the content delivery engine 208.

One component of an embodiment of an aspect of the example system architecture uses explanation-based diversity to improve the number and quality of results returned to a user query, for example on a tagged social networking site with user content, although the number of results returned are often fixed. An explanation is a set of items or users, upon which the recommendation algorithms make decisions as to whether to recommend a particular item. For an item-item similarity-based recommendation strategy, the explanation for a recommended item is the set of items similar to the recommended item that a current user has rated in the past. For a collaborative filtering recommendation strategy, the explanation of an item recommendation is the set of other users who are similar to the current user and who have rated the recommended item. The distance between two recommended items is the similarity between their explanations, which can be computed by an example system using any suitable distance formula, such as cosine similarity or Jaccard distance. The diversity of a result set is a distance value related to the distances between all pairs of recommended items in the result. The distance used may be the average, minimum or maximum distance amongst all pairs, or may be another suitably derived distance value.

Another component of an embodiment of an aspect is a suite of efficient diversification algorithms that balances the relevance and diversity of the top-K recommendation results. One method referred to as Swap, starts with the K highest scoring candidate items initially returned, and swaps the item which contributes the least to the diversity of the entire set with the next highest scoring item, among the remaining items, that improves the diversity of the entire set. Another method, referred to as Greedy, starts with the most relevant item of the candidate items initially returned and greedily adds the next most relevant item if and only if that item is dissimilar enough from existing items. The Greedy Method is iteratively repeated until the desired number of result items is obtained.

For simplicity, collaborative filtering examples are employed in the following detailed description; however, the techniques described apply equally well to item-based strategies. In order to perform collaborative filtering, networks of similar users are identified. Identification of networks of similar users in collaborative filtering is a computationally intensive task, so techniques relevant to identifying such networks are described.

Collaborative filtering strategies estimate the rating of an item for a given user based on the network of the user and how other users in the given user's network rate the item. There are two kinds of user networks, explicit networks and implicit networks.

An example of the former is the del.icio.us friendship network, where users become friends by explicit declaration. However, unlike pure social networking sites (e.g., Facebook), such explicit connections are rare in collaborative tagging/rating sites where the primary function is to help users identify and organize contents. For example, a recent snapshot of del.icio.us shows that only about 10% of the users have at least one explicit friend and about 1% of the users have at least five explicit friends. This means that if recommendations are based solely on friendship networks, 90% of the users will not receive any recommendation result in response to their queries.

Implicit networks, on the other hand, can be generated using various mechanisms, one of which is to leverage past behaviors of the users as identified by the items they tagged or rated before. Implicit networks complement explicit ones and can often significantly increase the number of users who benefit from recommendations in systems which employ both, as compared to system employing only explicit networks or only implicit networks. For example, in del.icio.us, by creating a link between two users who have shared common URLs, an implicit similarity network is established where 40% of the users have at least one similar user and 25% of the users have at least five similar users. Combined with explicit friendship networks, 45% of the users can benefit from such an exemplary recommender system. Another mechanism for generating implicit networks includes using profile information (e.g., age and income) about users. This information is not always available and as a result, the identification of users who share items is often the most common mechanism for implicit network generation.

When the number of users grows large, generating an implicit network is non-trivial. Consider a snapshot of del.icio.us over the span of one month. In a recent month, over 400,000 unique users have tagged at least one URL. A naïve algorithm, which does a comparison between each pair of users, would require 160 billion comparisons. At the currently reasonable rate of 10 micro-seconds per comparison, it will take the algorithm 18 days to finish, which is unrealistic for a website that is fast evolving i.e. evolving by the day, hour or even shorter time span.

Most of the comparisons are wasted; however, because an average user shares common URLs with only a small number of users among the total of 400K users. In other words, the resulting user-user similarity matrix is often very sparse. In view of this observation, the following method, Item-based Similarity Computation, is used in some embodiments of aspects for the generation of implicit shared-item user networks. It achieves efficiency by organizing items based on how many users have tagged/rated them and only does a comparison between two users if the comparison is likely to create a link.

Figure 3:
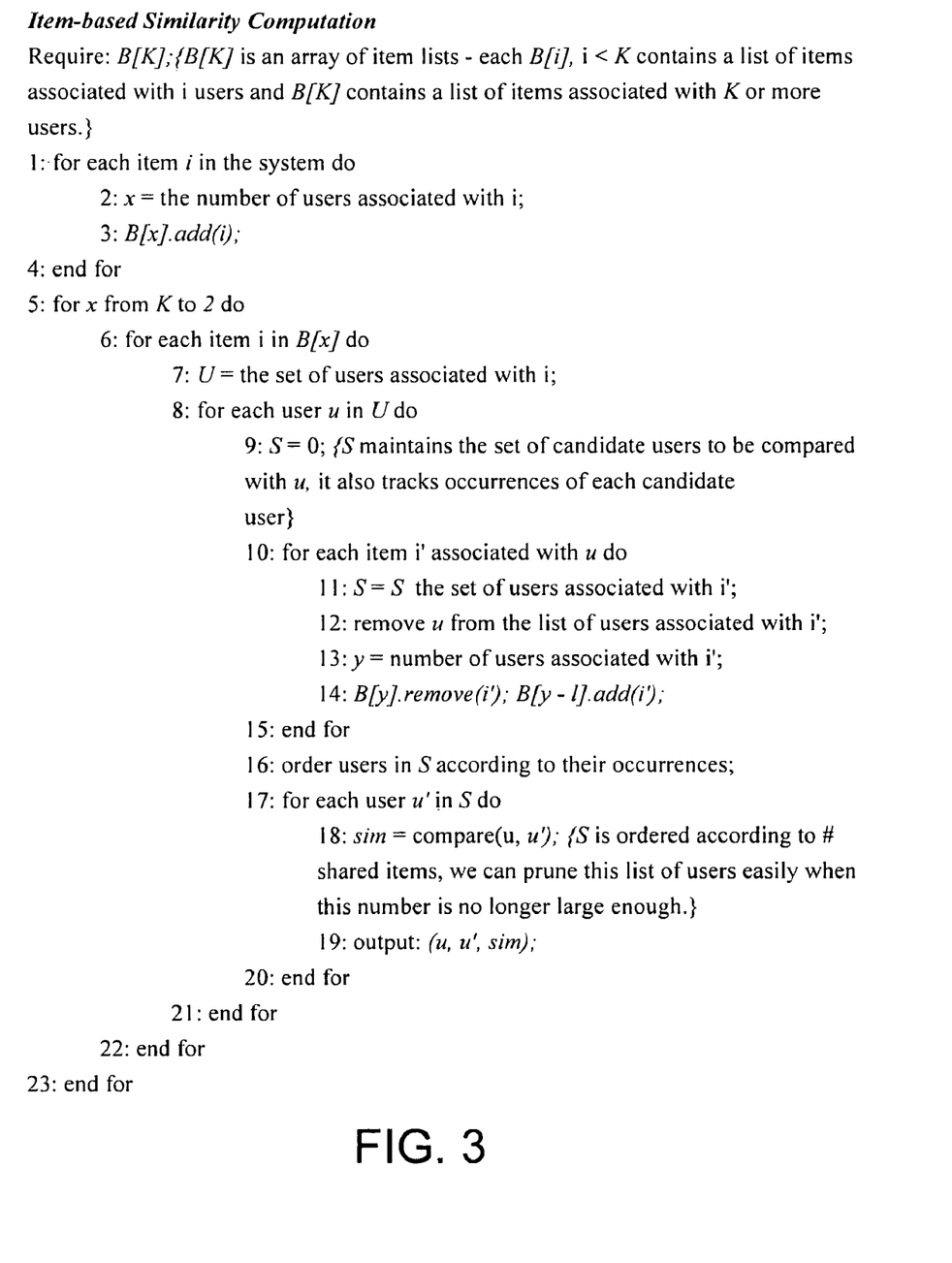
FIG. 3 is a pseudo-code example of a process for performing Item-Based Similarity Comparison.

The method, shown in the pseudo-code of FIG. 3, starts off by creating storage spaces for associating each item with the number of users associated with the item, i.e. constructing buckets for items (line 1-4), where items are put in the bucket corresponding to the number of users associated with them. A large number of items are eliminated right away because items associated with only one user are not useful for the processes which follow. Items associated with only one user will not contribute to any link between any pair of users. During the similarity computation, the method starts at the top-most bucket and iterates through all the items in each bucket. For each item, the method iterates through the set of users. For each user (u), the algorithm identifies all the users (line 8) associated with the set of items that u is associated with those are the candidate users to be compared with u. Since the number of items shared between u and each user in line 8 is obtained in the process for free, similarity threshold-based pruning can be easily applied here. For example, for Jaccard similarity, there is a simple and effective pruning method used in some embodiments of aspects. The number of shared items divided by the number of items of u gives us an upper bound on the actual similarity. If this upper bound is smaller than the threshold for a given pair, that pair is discarded. Furthermore, u can now be discarded from the user lists of all the items, which allow the items to be moved down the buckets (lines 12-14).

With the generation of the implicit network, all the elements needed for recommendations are available. There are two main pieces of information: the network and the actions. The network keeps information about the similarity between two users (or items in the case of item based recommendation). It can be given directly from the underlying system (e.g., del.icio.us) or it can be created as we described above. The actions are the tagging/rating histories of all the users. Those are always given by the underlying system and are always in the order of when the action happened. Both can be easily modeled as database tables (see Table for the schemas). Personal attributes of users and descriptive attributes of items can be maintained, as well, when they are available.

TABLE

Database Schemas

| Network | Action |
|---|---|
| src: int | user: int |
| dest: int | item: int |
| similarity: float | rating: float |

Any suitable storage system may be used in connection with the forgoing method. The storage system may or may not be compatible with the underlying system for organizing the items and information about the items. Using the storage system of the underlying system may provide advantages with respect to ease of implementation, while using a storage system incompatible with the underlying system may provide advantages with respect to special features or security. The exemplary embodiment employs a database (MySQL 5) compatible with the del.icio.us example as the back-end and only user native storage when necessary. As a result, most of the accesses described are implemented in the form of SQL queries.

Generally, collaborative filtering can be represented by the formula:

$$\text{relevance}(u,i) = \Sigma_{u' \in U} \text{UserSim}(u,u') \times \text{rating}(u',i),$$

where u is the universe of users.

Given a user du, for whom a list of recommendations is to be generated, the goal is to generate a list of items with the top-K estimated ratings. In a straightforward way, this process can be realized through the following three SQL queries, Q1, Q2 and Q3:

Q1: obtaining user network:
$U_{du}$=select C.dest, C.similarity
from Network C
where C.src=du and C.similarity>th1
Q2: obtaining candidate items:
I=select A.item, A.user, A.rating, $U_{du}$.sim
from Action A, $U_{du}$
where A.user in $U_{du}$.dest and A.rating>th2
Q3: generating recommendations:
R=select I.item, SUM(I.rating*I.sim) as score
from I
group by I.item
order by score
limit k In actual implementations, the three queries may take different forms as required by individual implementers; for example the three queries can be nested into a single SQL call to reduce the overhead of remote access or the syntax or partitioning of the parts of the tasks may differ to suit the implementation or query language used by the implementer. Thresholds th1, th2, and k are predefined threshold values selected to suitably limit the number of results returned in particular implementations.

Efficient approaches for explanation generation for collaborative filtering recommendation strategies are now described. The approaches described here can be readily applied by the skilled artisan to item-based recommendation strategies. The explanation of a recommended item di, for a given user du, is defined as the set of users (called contributors) who contributed to the score of the item. The contribution of each contributor, c, is: UserSim(du, c) x Rating(c, di). Each contributor can be treated equally and the explanation for (du, di) is then the set of contributors. Alternatively, each contributor taken together with their contributions and the explanation for (du, di) is the set of weighted contributors.

A naïve approach to computing explanations is to obtain the list of recommended items as described above, and then issue the following query, Q4, to retrieve the set of contributors and their contributions:

Q4: generating explanations:
E=select A.item, A.user as contributor,
 (A.rating*C.similarity) as contribution
from Action A, Network C, R
where C.src=du and A.item in R.item
and A.user=C.dest and A.rating>0.0

The system then collects the results and assembles all the contributors of a single item into a weighted list. This post-processing approach aggregates items twice; once during recommendation generation and again during explanation generation, when list aggregation is performed. Another approach is to issue a single query for each item being recommended, thus avoiding the second list aggregation. But the overhead of issuing numerous database queries quickly may offset all the gains made by avoiding the second aggregation.

A more efficient, integrated approach avoids the double aggregations by maintaining a view over the Action table where all the actions belonging to the same user are stored together as a single list, and within each list, the actions are sorted on ratings. Specifically, consider generating candidate recommendations for user du. From the Network table, obtain users who are similar to du together with the similarities. From those user lists, ratings assigned by those users on various items in descending order of their score are obtained. Since each user has a different similarity to du, this similarity can be used to adjust the rate at which each list is scanned. As each candidate item, i, is generated, the set of users similar to du who rated i and their contributions are readily available.

Given a set of candidate items, RecItems(u), and a given threshold K, the optimal scenario of recommendation is finding a set of items, which has both the highest diversity distance and the highest aggregated relevance. In general, however, such an optimal top-K answer set does not exist: maximizing diversity does not always correlate with the most relevant answers being chosen. As a result, a balance is desired between relevance and diversity. Four alternative processes are now discussed for identifying a subset of K items out of the set of N (>K) candidate items with different levels of tradeoff between relevance and diversity. Of those processes, MaxRel maximizes the relevance of the K items returned while MaxDiv maximizes the diversity distance of the K items. Since it is desired for a recommender system to recommend diverse, relevant results, two additional processes, Swap and Greedy are presented. Both are heuristic processes which maximize the diversity under relevance constraints. Here, and in the claims which follow, reference to these processes should be understood to refer to the processes specifically set forth herein and processes that achieve essentially the same results and/or operate substantially the same way.

Figure 4:
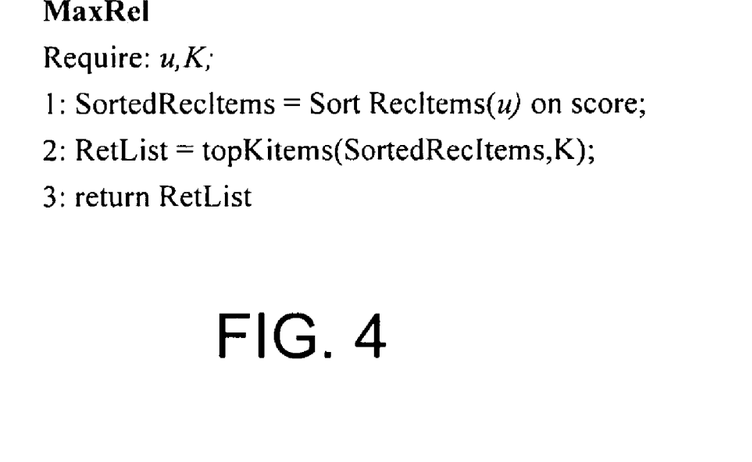
FIG. 4 is a pseudo-code example of a process for performing MaxRel, which selects maximally relevant items from a list of candidate recommendations.

MaxRel, shown in the pseudo-code of FIG. 4, simply extracts the top-K highest scoring items from the pool of items to be recommended. While achieving the highest relevance, the diversity of the result set may suffer.

Figure 5:
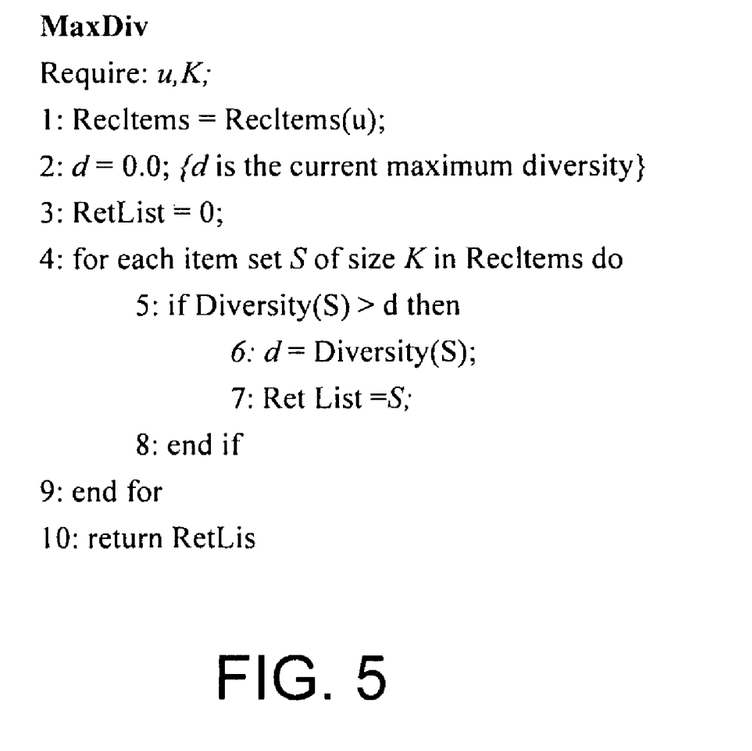
FIG. 5 is a pseudo-code example of a process for performing MaxDiv, which selects maximally diverse items from a list of candidate recommendations.

MaxDiv, shown in the pseudo-code of FIG. 5, on the other hand, iterates through all possible combinations of K items and identifies the one with the highest diversity to maximize the diversity of the result. There are two clear drawbacks of this algorithm. MaxDiv maximizes the diversity without considering relevance at all and as a result can produce result sets that have very low relevance. Second, iterating through all possible item sets of size K out of N items is extremely expensive: O(NK) when N>>K.

The two processes above represent two extremes in the two dimensional (relevance and diversity) space. Described next are two heuristic algorithms that balance the relevance and diversity of the resulting item set.

Figure 6:
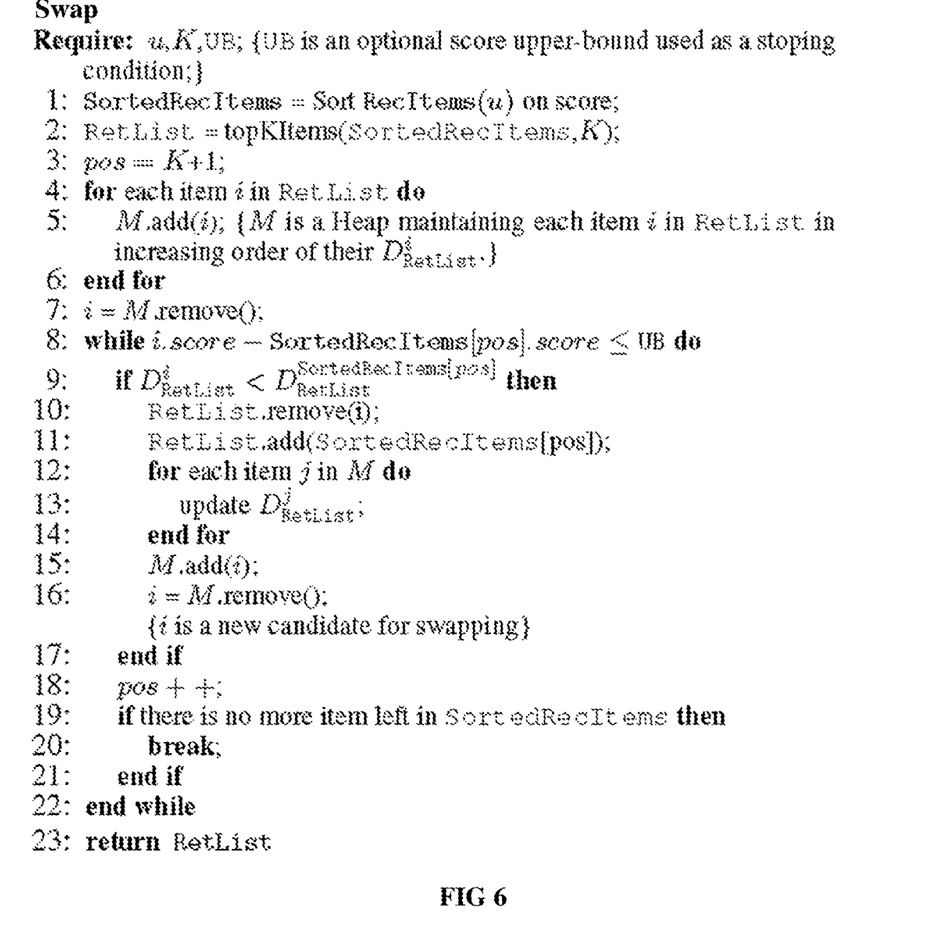
FIG. 6 is a pseudo-code example of a process for performing Swap, which selects a balance of diverse, relevant items according to one set of criteria.

Swap, shown in the pseudo-code of FIG. 6 starts with the K highest scoring items, and swaps the item which contributes the least to the diversity of the entire set with the next highest scoring item among the remaining items. During each iteration, an item with a lower relevance is swapped into the top-K set if and only if it increases the overall diversity of the resulting set. To prevent a sudden drop of the overall relevance of the resulting set, an optional pre-defined upper-bound DB (on how much drop in relevance is tolerated) can be used to stop the swapping when the lowest relevance of the remaining items is no longer high enough to justify the swap. The selection of the item to be swapped is accomplished by searching over all items in the current top-K set S and picking item i with the minimum diversity.

Swap pays the price of a relevance drop for the benefit of increasing diversity. Thus, the case where the top K items are retrieved (MaxRel) is a special case of Swap where UB is set to zero. The initial swap candidate selection takes $O(K^2)$ and each subsequent selection (up to N-K iterations, where N is the size of RecItems(u)) costs O(KlgK) to select the next candidate if a swap is needed. Therefore, Swap has an overall worst case complexity of O(NKlgK).

Figure 7A:
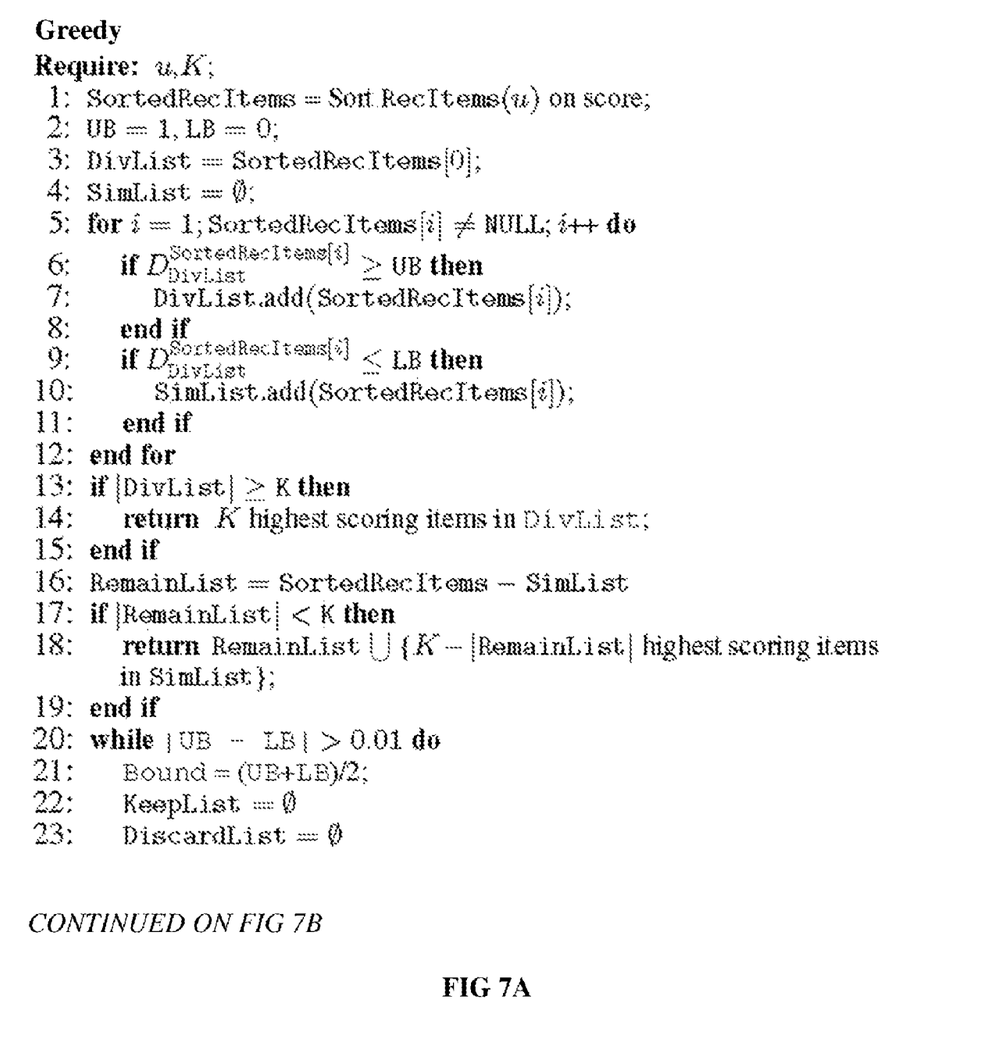
FIGS. 7A and 7B taken together are a pseudo-code example of a process for performing Greedy, which selects a balance of diverse, relevant items according to another set of criteria.
Figure 7B:
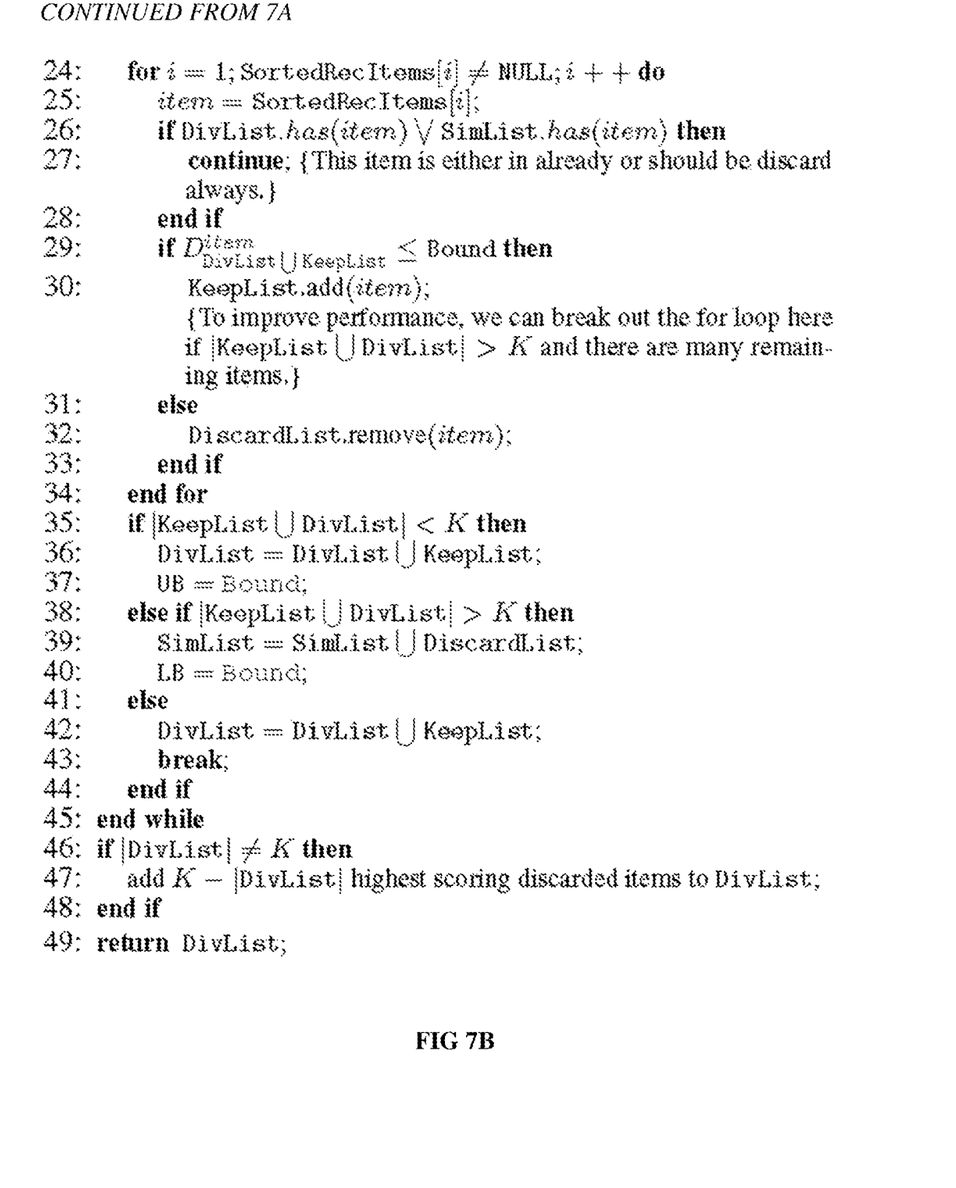

Another heuristic approach, the Greedy Process, shown in the pseudo-code of FIG. 7, starts with the most relevant item, greedily add the next most relevant item if and only if that item is far enough away (compared with a distance bound) from existing items in the set, and stops when there are K items. The distance bound can be hard to obtain and can vary from user to user.

To address this problem, Greedy relies on iteratively refining two diversity thresholds: an upper-bound UB, initially set to 1, and a lower-bound, LB, initially set to O. Greedy first iterates through the set of candidate items in the order of their relevance scores and generates two lists: DivList, and SimList. The DivList contains items that are all maximally distant from each other, while the SimList contains items that have zero distance to some items in DivList. Because items are accessed in the order of their relevance, SimList essentially contains items that we no longer consider. If DivList already contains enough items, the K most relevant items from are returned. If not, UB and LB are adjusted and Greedy reiterates through the candidate items.

At each iteration, the KeepList tracks items that will definitely be in the result set while the DiscardList tracks items that should be eliminated from consideration. These two lists are merged with DivList and SimList, respectively, at the end of each iteration. The algorithm stops when K are found in DivList or the difference between UB and LB drops below a threshold. At each pass, the worst case complexity is O(NK), the number of passes is limited since the bounds are limited between 0 and 1 and the algorithm stops when the difference between LB and UB is smaller than 0.01 (up to 9 passes).

A complete system for collaborative recommendation generates an implicit network of users, item and distances. A method of selecting diverse, relevant recommendations conforming to a desired balance of diversity and relevance, such as one of MaxRel, MaxDiv, Swap or Greedy, or a combination thereof, is then applied to create a limited, ordered list of recommendations responsive to a user query.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method of diversifying recommendation results, comprising:
receiving a request for a recommendation;
determining a preliminary set of items related to the request;
and identifying, using at least one of a SWAP and a GREEDY algorithm, a subset of the preliminary set to form a recommendation list having a limited number of recommendation results with a desired balance of both high relevancy and high diversity relative to each other;
wherein the method is performed by one or more computing devices.

2. The method of claim 1, wherein each respective item in the preliminary set of items is associated with a corresponding explanation and the corresponding explanation comprises:
data identifying items similar to the respective item, and which have been rated by the user.

3. The method of claim 1, wherein each respective item in the preliminary set of items is associated with a corresponding explanation and the corresponding explanation comprises data identifying other users similar to a user associated with the request, and who rated the respective item.

4. The method of claim 1, wherein using the at least one of a SWAP and a GREEDY algorithm comprises identifying distances based on a cosine similarity between explanations of items in the preliminary set.

5. The method of claim 1, wherein using the at least one of a SWAP and a GREEDY algorithm comprises identifying distances based on a Jaccard distance between explanations of items in the preliminary set.

6. The method of claim 1, wherein the SWAP algorithm comprises:
determining a highest scoring set of candidate items based on relevance to the request;
swapping an item which contributes least to a diversity of the highest scoring set with another item that was not previously included in the highest scoring set.

7. The method of claim 1, wherein the GREEDY algorithm comprises:
adding, to the recommendation list, a particular item from the preliminary set of items that is most relevant to the request;
adding a next most relevant item, to the recommendation list, only if the next most relevant item satisfies a dissimilarity threshold relative to one or more items already included in the recommendation list.

8. A non-transitory computer-readable medium carrying instructions which when executed by a computer carry out a method of diversifying recommendation results through explanations, comprising:
receiving a request for a recommendation;
determining a preliminary set of items related to the request; and
identifying, using at least one of a SWAP and a GREEDY algorithm, a subset of the preliminary set to form a recommendation list having a limited number of recommendation results with a desired balance of both high relevancy and high diversity relative to each other.

9. The computer-readable medium of claim 8, wherein each respective item in the preliminary set of items is associated with a corresponding explanation and the corresponding explanation comprises:
data identifying items similar to the respective item, and which have been rated by the user.

10. The computer-readable medium of claim 8, wherein each respective item in the preliminary set of items is associated with a corresponding explanation and the corresponding explanation comprises data identifying other users similar to a user associated with the request, and who rated the respective item.

11. The computer-readable medium of claim 8, wherein using the at least one of a SWAP and a GREEDY algorithm comprises identifying distances based on a cosine similarity between explanations of items in the preliminary set.

12. The computer-readable medium of claim 8, wherein using the at least one of a SWAP and a GREEDY algorithm comprises identifying distances based on a Jaccard distance between explanations of items in the preliminary set.

13. The computer-readable medium of claim 8, wherein the SWAP algorithm comprises:
determining a highest scoring set of candidate items based on relevance to the request;

swapping an item which contributes least to a diversity of the highest scoring set with another item that was not previously included in the highest scoring set.

14. The computer-readable medium of claim 8, wherein the GREEDY algorithm comprises:
adding, to the recommendation list, a particular item from the preliminary set of items that is most relevant to the request;
adding a next most relevant item, to the recommendation list, only if the next most relevant item satisfies a dissimilarity threshold relative to one or more items already included in the recommendation list.

15. A computer-implemented method of diversifying recommendation results comprising:
receiving a request for a recommendation for a particular user;
determining a preliminary set of items related to the request;
wherein each respective item in the preliminary set of items has been recommended by at least one user of a set of users;
identifying a subset of the preliminary set to form a recommendation list having a limited number of recommendation results that achieves a threshold balance of high relevancy and high diversity;
wherein identifying the subset comprises determining a diversity distance between items in the subset;
wherein the diversity distance is based at least in part on a ratio between (a) a number of items shared by the particular user and a respective user in the set of users and (b) a number of items associated with the particular user;
wherein the method is performed by one or more computing devices.

16. The method of claim 15, wherein the set of users comprise users that satisfy a threshold similarity to the particular user.

17. The method of claim 15, further comprising determining that the threshold balance has been achieved when the diversity distance indicates that the subset satisfies a diversity threshold.

18. The method of claim 15, wherein the diversity distance is further based on a weighting associated with a rating given to each respective item in the number of items by the respective user.

19. A non-transitory computer-readable medium carrying instructions which when executed by a computer carry out a method of diversifying recommendation results through explanations, comprising:
receiving a request for a recommendation for a particular user;
determining a preliminary set of items related to the request;
wherein each respective item in the preliminary set of items has been recommended by at least one user of a set of users;
identifying a subset of the preliminary set to form a recommendation list having a limited number of recommendation results that achieves a threshold balance of high relevancy and high diversity;
wherein identifying the subset comprises determining a diversity distance between items in the subset;
wherein the diversity distance is based at least in part on a ratio between (a) a number of items shared by the particular user and a respective user in the set of users and (b) a number of items associated with the particular user;
wherein the method is performed by one or more computing devices.

20. The computer-readable medium of claim 19, wherein the set of users comprise users that satisfy a threshold similarity to the particular user.

21. The computer-readable medium of claim 19, further comprising instructions for determining that the threshold balance has been achieved when the diversity distance indicates that the subset satisfies a diversity threshold.

22. The computer-readable medium of claim 19, wherein the diversity distance is further based on a weighting associated with a rating given to each respective item in the number of items by the respective user.

* * * * *